(12) United States Patent
Al-Khairy

(10) Patent No.: US 12,499,717 B2
(45) Date of Patent: Dec. 16, 2025

(54) METHOD AND SYSTEM FOR DATA TRANSMISSION FROM AN AIRCRAFT ENGINE

(71) Applicant: PRATT & WHITNEY CANADA CORP., Longueuil (CA)

(72) Inventor: Issam Al-Khairy, Verdun (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 290 days.

(21) Appl. No.: 17/580,526

(22) Filed: Jan. 20, 2022

(65) Prior Publication Data

US 2023/0230424 A1    Jul. 20, 2023

(51) Int. Cl.
| | |
|---|---|
| G01M 17/00 | (2006.01) |
| B64F 5/60 | (2017.01) |
| G07C 5/00 | (2006.01) |
| G07C 5/08 | (2006.01) |
| H02M 3/00 | (2006.01) |

(52) U.S. Cl.
CPC .............. *G07C 5/008* (2013.01); *B64F 5/60* (2017.01); *G07C 5/0808* (2013.01); *H02M 3/00* (2013.01)

(58) Field of Classification Search
CPC ......... G07C 5/008; G07C 5/0808; B64F 5/60; H02M 3/00
See application file for complete search history.

(56) References Cited

U.S. PATENT DOCUMENTS

| | | | |
|---|---|---|---|
| 8,295,995 B2 | 10/2012 | Poisson | |
| 10,703,497 B2 | 7/2020 | Bingham et al. | |
| 2009/0058183 A1* | 3/2009 | Morris | H02J 9/066 307/23 |
| 2009/0312892 A1* | 12/2009 | Mahoney | F02C 9/28 701/99 |
| 2010/0283319 A1* | 11/2010 | Boudyaf | B64D 15/12 307/9.1 |
| 2017/0369188 A1* | 12/2017 | Bulumulla | B64F 5/60 |
| 2020/0019154 A1* | 1/2020 | Cella | G05B 23/0286 |
| 2020/0332675 A1* | 10/2020 | Scheid | B64D 45/00 |
| 2022/0227231 A1* | 7/2022 | Husain | B60L 15/2045 |

FOREIGN PATENT DOCUMENTS

| | | |
|---|---|---|
| EP | 3159523 | 4/2017 |
| EP | 3357810 | 8/2018 |
| GB | 2494416 | 3/2013 |

* cited by examiner

*Primary Examiner* — Adam M Alharbi
(74) *Attorney, Agent, or Firm* — NORTON ROSE FULBRIGHT CANADA LLP

(57) ABSTRACT

Methods and systems for transmitting data from an aircraft engine. A plurality of input signals are received at a control device, during an operation of the aircraft engine, from one or more sensors of the aircraft engine, one or more actuators of the aircraft engine, or any combination of the one or more sensors and the one or more actuators. The plurality of input signals are combined, at the control device, into an output signal indicative of the operation of the aircraft engine. The output signal is transmitted, at the control device, to a controller located remotely from the aircraft engine.

20 Claims, 5 Drawing Sheets

METHOD AND SYSTEM FOR DATA TRANSMISSION FROM AN AIRCRAFT ENGINE

TECHNICAL FIELD

The disclosure relates generally to aircraft engines and, more particularly, to data transmission from aircraft engines.

BACKGROUND

Aircraft engines typically employ electronic engine control (EEC) systems which govern engine operations based on data received from various engine sensors and actuators individually wired to the EEC. Due to reliability concerns and a desire to protect the EEC from the harsh environment to which aircraft engines are generally subjected, it may be desirable to position the EEC remotely from the engine. However, this may increase the weight and complexity of the engine-to-EEC harness, particularly in larger engines having a significant number of sensors and actuators.

Therefore, improvements are needed.

SUMMARY

In one aspect, there is provided a method for transmitting data from an aircraft engine, the method comprising: receiving at a control device, during an operation of the aircraft engine, a plurality of input signals from one or more sensors of the aircraft engine, one or more actuators of the aircraft engine, or any combination of the one or more sensors and the one or more actuators; combining, at the control device, the plurality of input signals into an output signal indicative of the operation of the aircraft engine; and transmitting, at the control device, the output signal to a controller located remotely from the aircraft engine.

In another aspect, there is provided a system for transmitting data from an aircraft engine, the system comprising: one or more sensors of the aircraft engine, one or more actuators of the aircraft engine, or any combination of the one or more sensors and the one or more actuators; a controller located remotely from the aircraft engine; and an control device associated with the aircraft engine, the control device communicatively coupled with the one or more sensors of the aircraft engine, one or more actuators of the aircraft engine, or any combination of the one or more sensors and the one or more actuators and with the controller, the control device configured to receive, during an operation of the aircraft engine, a plurality of input signals from the one or more sensors of the aircraft engine, one or more actuators of the aircraft engine, or any combination of the one or more sensors and the one or more actuators, combine the plurality of input signals into an output signal indicative of the operation of the aircraft engine, and transmit the output signal to the controller.

BRIEF DESCRIPTION OF THE DRAWINGS

Reference is now made to the accompanying figures in which.

It will be noticed that throughout the appended drawings, like features are identified by like reference numerals.

DETAILED DESCRIPTION

Figure 1:
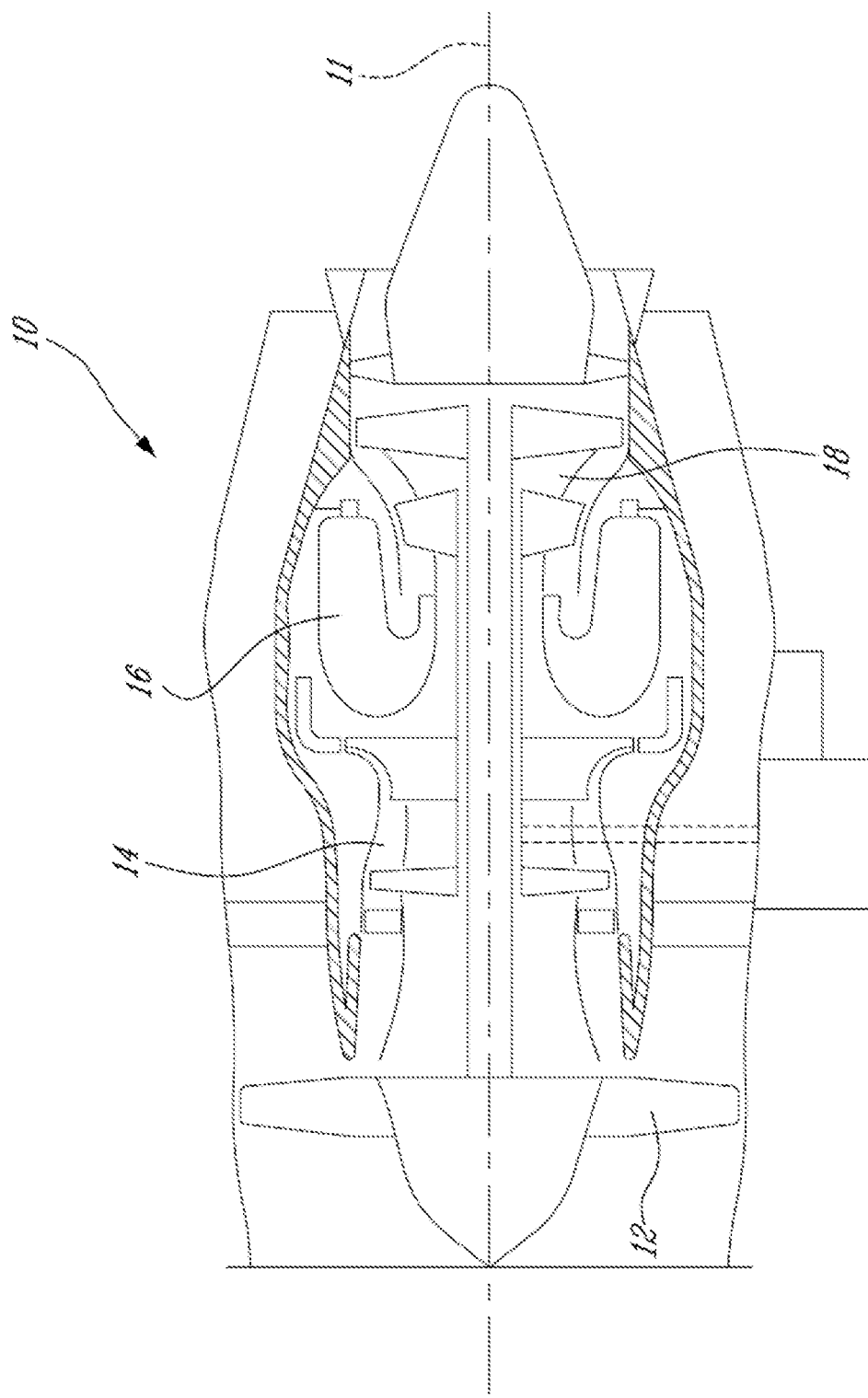
FIG. 1 is a schematic cross sectional view of a gas turbine engine.

FIG. 1 illustrates a gas turbine engine 10 with central axis 11 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Although illustrated as a turbofan engine, the gas turbine engine 10 may alternatively be another type of aircraft engine, for example a turboshaft engine, also generally comprising in serial flow communication a compressor section, a combustor, and a turbine section, and a fan through which ambient air is propelled. A turboprop engine may also apply.

Figure 2:
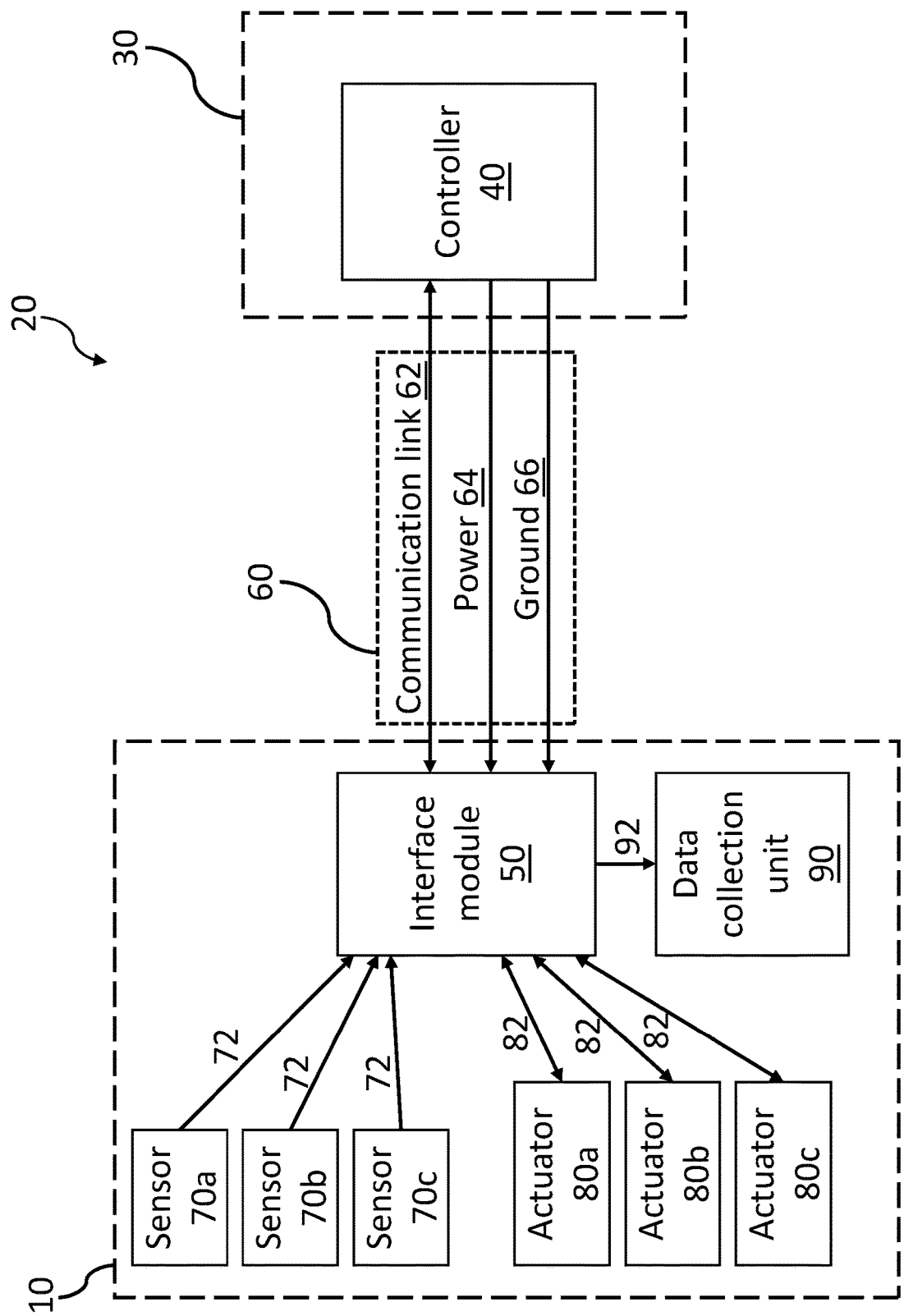
FIG. 2 is a block diagram of an example system for transmitting data from an aircraft engine.

Referring to FIG. 2, an exemplary system 20 for transmitting data from an aircraft engine, such as the engine 10 of FIG. 1, is shown. Various components that form system 20, or that interact with system 20, may be provided on the engine 10, or located in a location 30 (referred to as an "off-engine location") remote from the engine 10. As used herein, the terms "remote location" or "off-engine location" refer to a location that is at a given distance from the engine 10 such that the aircraft components provided at the location 30 are not exposed to the harsh operating environment to which gas turbine engines are typically subjected. Such a harsh operating environment may be characterized, for example, by high temperatures (e.g., substantially equal to or above 600 degrees Celsius), high humidity levels, and/or high vibration levels. For instance, the location 30 may be a cockpit or fuselage of the aircraft on which the engine 10 is provided, where temperature, humidity, and/or vibration levels may be lower than those experienced on (or proximate to) the engine 10. Other remote or off-engine locations 30 may be contemplated.

A controller 40 is positioned in the remote or off-engine location 30 and is communicatively coupled to the engine 10. More specifically, the controller 40 is communicatively coupled via a harness 60 to an interface module 50 provided on or otherwise associated with the engine 10, and is configured for acquiring, from the interface module 50, data obtained from various sensors 70 and/or actuators 80. The controller 40 is in turn configured for controlling operation of the engine 10 based on the data acquired from the interface module 50. In one embodiment, the exemplary controller 40 is an engine controller, illustratively an electronic engine controller (EEC). Other engine controllers such as a full-authority digital engine controls (FADEC), an engine control unit (ECU) or the like, or other controllers, may apply.

Although FIG. 2 shows the interface module 50 as being provided on the engine 10 (e.g., mounted on the engine 10 via one or more hanging or mounting brackets, not shown), it should be understood that the interface module 50 may be positioned in any other suitable location associated with (i.e., proximate) the engine 10. For instance, in some embodiments, the interface module 50 may be located immediately outside of the engine 10. It is however desirable to minimize the distance between the interface module 50 and the sensors 70 and actuators 80, such that it may be preferable for the interface module 50 to be provided on the engine 10. Moreover, locating the interface module 50 in close proximity to the sensors 70 and actuators 80 may improve signal accuracy and simplify installation. In comparison, the controller 40 is positioned remotely from the engine 10, in the off-engine location 30, where it is not exposed to the harsh environment typically associated with the engine 10. Such positioning may improve the overall reliability of the controller 40, for instance due to a decreased thermal load and reduced exposure to vibrations and noise. As will be discussed further below, the distance between the interface module 50 and the sensors 70 and actuators 80 and the distance between the controller 40 and the engine 10 may vary depending on engine and/or aircraft configuration (e.g., on aircraft size).

To minimize the number of communication links (e.g., electrical cables, connectors, harnesses, and the like) exiting the engine 10 towards the controller 40, it is proposed herein to configure the interface module 50 as an on-engine hub that communicates with the engine sensors 70 and actuators 80 and acts as a relay between the engine sensors 70 and actuators 80 and the controller 40. The interface module 50 may also be referred to as a sensor (and actuator) to EEC interface (in cases where the controller 40 is an EEC), as a relay interface, or as a control device. The sensors 70 and actuators 80 may comprise any sensor and/or actuator typically found in an aircraft engine, such as engine 10, and otherwise configured for communicating directly with the controller 40. It should be understood that, although only sensors as in 70 and actuators as in 80 are illustrated and described herein as being communicatively coupled to the interface module 50 for providing data thereto, any other suitable component of the engine 10 (and/or the aircraft) configured to obtain data relevant to the operation of the engine 10 for subsequent transmission to the controller 40 may apply.

As will be discussed in further detail below, the interface module 50 may combine the various signals received from the sensors 70 and/or actuators 80 (and/or any other suitable engine component as discussed above) into a single, unified signal to be transmitted to the controller 40. Thus, the number of communication links required to transmit data from the sensors 70 and actuators 80 to the controller 40 may be reduced in comparison with a traditional system in which each sensor 70 and actuator 80 would be directly connected to the controller 40. Indeed, in one embodiment, the system 20 may require a single communication link between the engine 10 and the controller 40 (rather than multiple communication links between each sensor 70 and actuator 80 and the controller 40) in order to transmit data from the engine 10. In comparison with traditional systems, this reduced number of communication links (e.g., cables) extending between the engine 10 and the controller 40 may significantly reduce the overall weight of the engine-to-controller harness. The reduced number of cables may contribute to a decrease in complexity and cost of the overall system 20 as well.

As a non-limiting example, the distance between interface module 50 positioned on the engine 10 and the controller 40 positioned in the remote location 30 may range from approximately three meters (in the case of a smaller aircraft) to approximately thirty meters (in the case of a larger aircraft). Conversely, the distance between the various sensors 70 and actuators 80 and the interface module 50 may range from approximately half of a meter to one meter, depending on, for instance, the nature and location of each sensor 70/actuator 80 and the size of the aircraft. Other distances may be contemplated. Thus, by using the interface module 50 to combine the signals from the various sensors 70 and actuators 80 and transmit the combined signals to the controller 40, each cable transmitting data to and/or from each sensor 70 and actuator 80 may be of a reduced length compared to traditional systems.

As will be discussed in further detail below, in some cases, the controller 40 may be configured to provide electrical power to the interface module 50, illustratively via a power cable 64 and associated ground cable 66. In one embodiment, the power cable 64 may be a Direct Current (DC) bus providing 28 volts DC power to the interface module 50. Other voltages may be contemplated. In other cases, the interface module 50 may receive electrical power through alternate means, for instance from a DC power source (not shown) located proximate the engine 10. For example, a main battery or an Auxiliary Power Unit (APU) battery (not shown) may be used to provide DC electrical power to the interface module 50.

Various sensors 70 may be communicatively coupled to the interface module 50. The sensors 70 may comprise a variety of data collection devices mounted in the engine 10 (or other locations throughout the aircraft). In some embodiments, the sensors 70 are mounted directly on the engine 10 and installation may be permanent or temporary. A permanent mount may be performed during manufacture of the engine 10. A temporary mount may be performed after manufacture of the engine 10 and/or after aircraft assembly, such as during aircraft maintenance.

While FIG. 2 illustratively shows three (3) sensors 70, denoted as sensors 70a, 70b, 70c, it is understood that this is for illustrative purposes only and the interface module 50 may be configured for receiving data from any suitable number of sensors. The interface module 50 may therefore comprise any suitable number of input channels configured to receive input from a corresponding number of sensors 70. In larger aircrafts, it is for instance possible that hundreds of sensors, or in some cases more, may be used. Such sensors 70 may measure, for instance, various parameters associated with operation of the engine 10 and/or the aircraft. The sensors 70 are indeed configured to acquire measurements of parameters including, but not limited to, pressure (e.g., engine inlet total pressure, interstage pressure, engine pressure ratio or EPR), temperature (e.g., engine inlet total temperature, turbine inlet temperature, interstage temperature, engine exhaust gas temperature or EGT), altitude, speed (e.g., rotor speed of the engine's low-pressure rotor and high-pressure rotor, measured in Revolutions Per Minute (RPM)), angular velocity, acceleration, power, torque, and the like. In particular, the engine 10 may include an oil level sensor (OLS), various temperature sensors and various pressure sensors positioned at suitable locations throughout the engine 10. For example, in addition to the OLS, the sensors 70 may comprise an intake temperature sensor (T1), a mean oil temperature (MOT) sensor, and a mean oil pressure (MOP) sensor. Other sensors may be contemplated, depending on the type of the engine 10 and/or aircraft and on the application, such that any suitable measurement(s) associated with operation of the engine 10 and/or aircraft may be collected by the sensors 70.

The sensor measurements may be collected continuously and in real-time, in order to provide a complete indication of the performance of the engine 10 (and/or aircraft) during flight. The measurement(s) may, alternatively or in addition, be collected at one or more points in time during a flight mission. In some embodiments, measurements may be acquired by the sensors 70 while the aircraft is on the ground. The sensor measurements (also referred to herein as "sensor data" or "measurement data") are then communicated from the sensors 70 to the interface module 50. For this purpose, each sensor 70 may be communicatively coupled to the interface module 50 via a communication link 72. The type of signal provided by each sensor 70 may vary, and thus the type of each communication link 72 may also vary. In some embodiments, the sensors 70 may be configured to output electrical signals and the communication links 72 may thus comprise one or more electrical cables. In other embodiments, the sensors 70 may be configured to output optical signals and the communication links 72 may thus comprise one or more fiber optic cables. The interface module 50 may thus be configured for receiving multiple types of input signals from the sensors 70, as will be discussed in further detail below.

In addition, in some cases, one or more of the sensors 70 may require power to operate. As such, in embodiments where the interface module 50 receives power from the controller 40, the interface module 50 may be configured for directing some or all of the received power to one or more of the sensors 70, as will be discussed in further detail below.

In some cases, one or more of the sensors 70 may be a smart sensor configured for, in addition to providing measurements to the interface module 50, performing self-diagnosis, communicating its status, and/or reporting any issue that may occur relating to the engine parameter(s) being measured by the smart sensor. For instance, the smart sensors may be configured for measuring temperatures and/or pressures within the engine 10 and reporting, based on the temperature and/or pressure measurements, any issues relating to a condition or performance of the engine 10. In addition, in some embodiments, the smart sensors may be configured to independently determine (using internal computer processing, control logic feedback, and the like) a command, an operation, and/or a position for one or more components of the engine 10. In some embodiments, such smart sensors may require an optical connection to report both their recorded measurements and potential issues. The interface module 50 may be configured to communicate with (i.e. receive signals from) such smart sensors, which communicate via optical signals. As previously noted, the interface module 50 may therefore be configured to receive from the sensors 70 and/or actuator 80 signals of one or more types (e.g., electrical signals and/or optical signals) and to generated from the received input signals into a single output signal of a given type (also referred to herein as a "unified signal") for transmission to the controller 40.

Various actuators 80 located throughout the engine 10 may be communicatively coupled to the interface module 50. It should be understood that actuators provided in other locations throughout the aircraft may also be communicatively coupled to the interface module 50. While FIG. 2 illustratively shows three (3) actuators 80, denoted as actuators 80a, 80b, 80c, it is understood that this is for illustrative purposes only and the interface module 50 may be configured for receiving data from any other number of actuators 80. It should also be understood that the number of actuators 80 may differ from the number of sensors 70. The interface module 50 may therefore comprise any suitable number of input channels configured to receive input signals from a corresponding number of actuators 80. In one embodiments, the input signals received from the actuators 80 are electrical signals, i.e. analog or digital signals.

The actuators 80 are configured to adjust one or more engine parameters (e.g., adjust physical components of the engine 10) according to one or more engine control commands (e.g., received from the controller 40 or any other control unit associated with the engine 10). The engine control commands may comprise any suitable engine control command for causing the actuators 80 to adjust an engine parameter to control (or modify) an operating condition of the engine 10. In some embodiments, the engine control commands may comprise one or more commands for adjusting a fuel flow (WF) to the engine 10, a position of at least one inlet guide vane (IGV) of the engine 10, a position of at least one core variable guide vane (VGV) of the engine 10, engine bleed, a position of at least one blow off valve (BOV) of the engine 10, or the like. For example, the actuators 80 may actuate (e.g. turn "ON" or "OFF") a fuel pump (nor shown) in order to adjust fuel flow to the engine 10. Any suitable type of actuators 80 may therefore apply, including, but not limited to, electrical, mechanical, pneumatic, and hydraulic. For example, the actuators 80 may include a fuel management unit (FMU) and a bleed valve actuator (BVA) for the engine 10. Other actuators for controlling operation of any suitable physical component of the engine 10 may be contemplated. It should also be understood that the one or more of the actuators 80 may be smart actuators configured to communicate their status, report issues, and/or independently perform any action to cause an improvement in the condition or performance of the engine 10.

Each actuator 80 may be communicatively coupled to the interface module 50 via a communication link 82. In some embodiments, the actuators 80 may include integrated sensors configured for reporting data to the interface module 50 via the communication links 82, the data being in turn communicated from the interface module 50 to the controller 40. The input signals communicated by the actuators 80 to the interface module 50 contain data collectively referred to herein as "actuator data". Such data may include information relating to, for instance, a status of a given actuator 80 before, during, or after an actuation action has occurred. Other configurations may be contemplated, for instance a given sensor 70 positioned adjacent a given actuator 80 and configured for monitoring and reporting a status of the actuator 80. The interface module 50 may be configured to receive, via a dedicated communication link 62 (e.g., a Controller Area Network (CAN) bus, an Inter-Integrated Circuit (I2C) bus, or other serial communication bus), actuation instructions from the controller 40 (e.g., subsequent to communicating actuator data from the actuators 80 to the controller 40) and to provide the actuation instructions to one or more of the actuators 80 via the communication links 82. Thus, in one embodiment, the communication links 82 between the actuators 80 and the interface module 50 may be bidirectional.

In some embodiments, the actuators 80 may require power to operate. As such, in embodiments where the interface module 50 receives power from the controller 40, the interface module 50 may be configured for providing part or all of the received power to one or more of the sensors 70, as will be discussed in further detail below. In other embodiments, the actuators 80 requiring power to operate may be provided with power via one or more alternate power sources in the engine 10.

Any suitable communication protocol or standard may be used to transmit data from the sensors 70 and/or actuators 80 to the interface module 50 (and from the interface module 50 to the actuators 80, when applicable). The Aeronautical Radio Inc. (ARINC) 429 data transfer standard for aircraft avionics may be used. Other data standards may also be used, including, but not limited to, ARINC 615, ARINC 629, ARINC 717, ARINC 664, CAN, UART RS-422, Ethernet and MIL-STD-1553. Alternatively, transmission of the data collected by the sensors 70 and/or actuators 80 is performed wirelessly. Therefore, the sensors 70 and/or actuators 80 may be configured for providing data to the interface module 50 via communication links 72 and/or 82 comprising any suitable wired or wireless communication path, including, but not limited to, RS-232, USB, USB 2.0, USB 3.0, USB-C, SATA, e-SATA, Thunderbolt™, Ethernet, Wi-Fi, Zigbee™, Bluetooth™, and the like.

Data (e.g., engine data including sensor data received form the sensors 70, actuator data received from the actuators 80, performance data, and the like) collected by the controller 40 (e.g., via interface module 50) may optionally be stored in a memory (or other suitable storage) associated with a data collection unit (DCU) 90. In the depicted embodiment, the DCU 90 is communicatively coupled to the interface module 50 via a communication link 92 (using any suitable communication protocol) and is provided on the engine 10. As such, the controller 40 may be configured for transmitting data to be stored to the interface module 50 via communication link 62, and the interface module 50 may in turn be configured for transmitting the data to the DCU 90 via communication link 92. The DCU 90 may then be configured to store the data in the memory upon receipt. In other cases, the DCU 90 may be positioned in another location, for instance in the remote or off-engine location 30, and communicatively coupled to the controller 40 directly such that data may be stored in the DCU 90 without using the interface module 50 as an intermediary.

Figure 3:
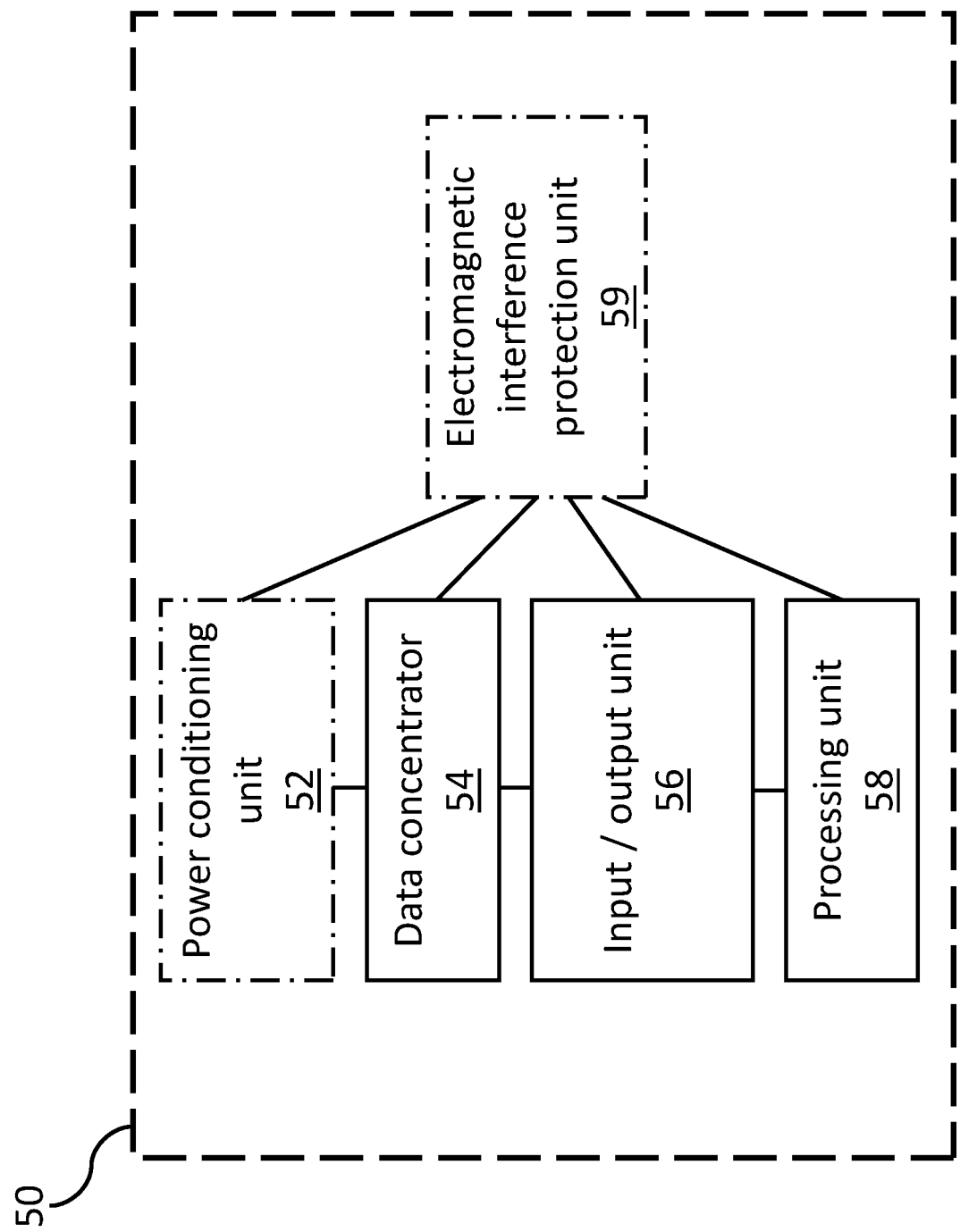
FIG. 3 is a block diagram of the interface module of FIG. 2.

Referring to FIG. 3 in addition to FIG. 2, an exemplary interface module 50 for the data transmission system 20 is shown. The depicted interface module 50 may be implemented using a combination of software and hardware and includes a plurality of interconnected components, namely an optional power conditioning unit 52, a data concentrator 54, an input/output unit 56, a processing unit 58, and an optional electromagnetic interference (EMI) protection unit 59.

As discussed above, in some cases the interface module 50 receives power from the controller 40 at the power conditioning unit 52 (via power cable 64 of FIG. 2). The interface module 50 may then be configured to distribute, using the power conditioning unit 52 (and via communication links 72, 82), part or the entirety of the received power to the one or more sensors 70 and/or actuators 80 for powering thereof. One or more additional DC power busses (not shown) may be provided between the interface module and any sensor 70 and actuator 80 receiving power therefrom. In some cases, the interface module 50 may be configured to receive power from a power source within the engine 10 other than the controller 40 (e.g., from a main battery or an APU battery as discussed above), and to provide power from this source, via power conditioning unit 52, to the one or more sensors 70 and/or actuators 80.

The power conditioning unit 52 may be configured to filter out noise (using any suitable filtering technique) from the received power and to perform a power conversion before distributing the power to the one or more sensors 70 and/or one or more actuators 80. The power conditioning unit 52 may therefore comprise a filter configured to remove unwanted components or features from the input signals, and an electrical (or electro-mechanical) power converter, such as a DC-to-DC converter configured to convert a source of DC from one voltage level to another. In an exemplary embodiment, the interface module 50 may receive DC power rated at 28 volts (via power cable 64), perform a noise filtering process, and perform one or more power conversion processes to supply the one or more sensors 70 and/or one or more actuators 80 with DC power rated at a desired voltage (e.g., 12 volts, 5 volts, or the like). Any suitable power conversion may apply, depending on the input power received at the power conditioning unit 52 (e.g., from the controller 40) and on the type of sensors 70 and actuators 80. It should however be understood that, in some embodiments, no power conversion may be performed by the power conditioning unit 52. In this case, the power supplied to the one or more sensors 70 and/or one or more actuators 80 may be rated at the same voltage as the power received (e.g., from the controller 40), for instance 28 volts. In some cases, for instance where the sensors 70 and/or actuators 80 requiring power are not powered through the interface module 50 but are instead powered via other means (e.g., directly from the main battery or the APU battery), the power conditioning unit 52 may be omitted.

In one embodiment, the input/output unit 56 may be implemented as a transceiver comprising a receiver and a transmitter. The input/output unit 56 may have any suitable number of input channels communicatively coupled to the sensors 70 and actuators 80 (via communication links 72, 82), and in some embodiments to the controller 40 (via communication link 62) for receiving data therefrom. The input/output unit 56 may also have an output channel communicatively coupled to the controller 40 (via communication link 62). The input/output unit 56 may further comprise additional output channels communicatively coupled, for instance, to the data collection unit 90 (via communication link 92) and/or to one or more actuators 80 (via communication links 82) to provide thereto data received from the controller 40. The input/output unit 56 may therefore act as a communications hub to control the flow of data entering and exiting the interface module 50. As discussed herein, the communication links 72, 82 from the sensors 70 and actuators 80 may be configured to communicate signals of different signal types such that the interface module 50 may be configured for receiving input signals of electrical, optical, or other signal types. The input channels of the input/output unit 56 may therefore be configured to accommodate different types of communication links (e.g. different wire or cable types). In addition, some of the channels of the input/output unit 56 may be bidirectional (i.e. serve as both input and output channels) to interface with bidirectional links, such as communication link 62 and communication links 82.

The input signals received from the sensors 70 and/or actuators 80 are transmitted (using any suitable communication protocol) to the data concentrator 54 which is communicatively coupled to the input/output unit 56. The data concentrator 54 is configured for generating, based on the signals received from the sensors 70 and/or actuators 80, an output signal to be transmitted to the controller 40, the output signal indicative of the operation of the aircraft engine 10. In some cases, the interface module 50 is configured for receiving (via the input/output unit 56 as described herein) signals of different types and the data concentrator 54 is configured for converting the different signal types into a single signal type. Such conversion processes may be performed using the processing unit 58, by implementing any suitable signal processing technique. It should therefore be understood that, although the processing unit 58 is illustrated as being separate from the data concentrator 54, the processing unit 58 may, in some embodiments, be integrated with the data concentrator 54.

For instance, the interface module 50 may receive electrical signals and optical signals from the sensors 70 and actuators 80. The data concentrator 54 may then convert (e.g., using the processing unit 58) the received signals into an output signal of a single signal type, for instance an electrical signal or an optical signal. This may be achieved by the processing unit 58 performing electro-optical (or opto-electrical) signal conversion. In some embodiments, the data concentrator 54 may be further configured for converting (e.g., using the processing unit 58) analog signals received from the sensors 70 and/or actuators 80 into digital signals, and vice versa. The type of output signal provided by the data concentrator 54 may thus vary depending on engine configuration (e.g., on the type of communication link 62 coupling the interface module 50 to the controller 40). It should however be understood that, in some embodiments, the input signals received from the sensors 70 and/or actuators 80 at a given point in time may all be of the same type (and be of a format transmissible to the controller 40), and, as such, no signal conversion may need to be performed by the data concentrator 54.

In some embodiments, the sensors 70 and actuators 80 communicate with the interface module 50 concurrently such that all sensors 70 and actuators 80 may simultaneously be in communication with the interface module 50 at any given time. In other embodiments, the sensors 70 and actuators 80 may communicate with the interface module 50 at different times or sequentially (i.e. one at a time). In addition to optionally converting the input signals received from the sensors 70 and/or actuators 80 from one signal type to another, the data concentrator 54 may be configured for combining the plurality of input signals to generate the output signal to be transmitted to the controller 40. For this purpose, the data concentrator 54 may, in some embodiments, include one or more multiplexers configured for switching multiple input lines (i.e., the plurality of signals received from the sensors 70 and actuators 80 via communication links 72, 82) into a single output line (i.e., an output signal to be transmitted to the controller 40 via communication link 62), in a recoverable manner for each input signal. In one embodiment, the controller 40 may comprise one or more corresponding de-multiplexers for recovering the individual input signals. The data concentrator 54 may include analog multiplexers and/or digital multiplexers and any suitable multiplexing and demultiplexing technique may be used. Other means for signal combination (other than multiplexing) may be contemplated.

Once the output signal is generated, the data concentrator 54 may be configured to communicate the output signal to the input/output unit 56 for subsequent transmission to the controller 40, via communication link 62 provided between the interface module 50 and the controller 40. The communication link 62 may carry, for instance, an analog or a digital signal. In some embodiments, the communication link 62 may be wired (e.g., CAN bus, I2C bus, or the like). In some cases, the communication link 62 between the interface module 50 and the controller 40 may include two or three cables, each configured for carrying the unified signal combined by the data concentrator 54, for redundancy. In other embodiments, the communication link 62 may comprise a fiber optic data link that communicatively couples the interface module 50 to the controller 40. In such cases, using fiber optic cables may reduce the susceptibility of the harness 60 to electromagnetic interference (EMI), in comparison with a typical harness which would require heavy and costly copper shielding on its wires as a preventative measure to reduce EMI. In other cases, the interface module 50 may communicate wirelessly with the controller 40, such that the communication link 62 is wireless. As used herein, the term "wireless" refers to the transfer of information (or data) between two points that are not connected by an electrical conductor. Any suitable wireless technology may be used to establish a wireless connection as in 62 including, but not limited to, radio waves (e.g., VHF radio, HF radio), Bluetooth™, Ultra-wideband (UWB), mobile broadband, wireless spread spectrum such as Wi-Fi (Standardized as IEEE 802.11 a, b, g, n, ac, ax), cellular data service, and satellite communication (SATCOM), and the like.

In some embodiments, since the functionalities of the interface module 50 include combining (and potentially converting) input signals and communicating a single output signal to the controller 40, actuation instructions to the actuators 80 and, optionally, data for storage to the DCU 90, the interface module 50 may be seen as having lower complexity than the controller 40. In contrast to the controller 40, the interface module 50 may thus readily withstand the harsh environment in which the engine 10 is operating.

In some embodiments, the interface module 50 may include an EMI protection unit 59 configured to protect or suppress EMI that may, for instance, be due to lightning strikes, solar flares, noise, etc. The EMI protection unit 59 may include circuitry for providing EMI protection or suppression at the various inputs and outputs within and/or around the interface module 50. In addition, in some embodiments, the EMI protection unit 59 may be configured to filter noise from the signals (e.g., data signals and power signals) received at and/or output by the interface module 50. For this purpose, the EMI protection unit 59 may be coupled to one or more of the power conditioning unit 52, the data concentrator 54, the input/output unit 56, and the processing unit 58. Although the EMI protection unit 59 is illustrated as being separate from the power conditioning unit 52, the data concentrator 54, the input/output unit 56, and the processing unit 58, it should be understood that the EMI protection unit 59 may be integrated therewith. Other locations for the EMI interference protection unit 59 may also be contemplated. In addition, more than one EMI protection unit 59 may be provided.

Figure 4:
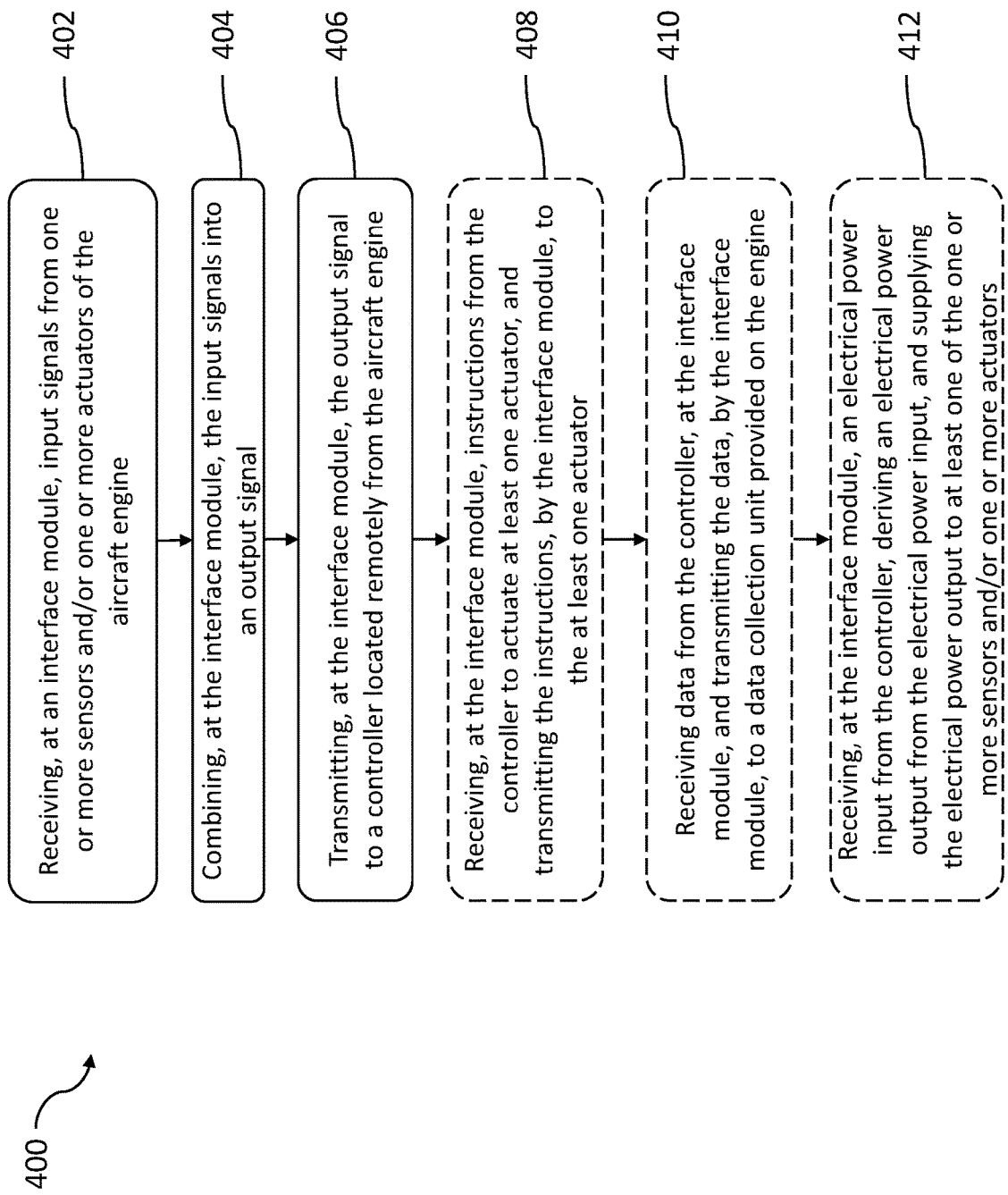
FIG. 4 is a flowchart illustrating an example method for transmitting data from an aircraft engine.

With reference to FIG. 4 in addition to FIG. 2, there is illustrated a flowchart for a method 400 for transmitting data in an aircraft engine, for instance the engine 10. The engine 10 can be provided with a controller, for instance the controller 40, located remotely from the engine in the aircraft and which can communicate with an interface module provided on the engine, for instance interface module 50, via a communication link 62. At step 402, input signals from one or more sensors, for instance sensors 70, and/or one or more actuators, for instance actuators 80, are received at the interface module provided on the aircraft engine. The input signals are received (e.g., via communication links 72, 82, using any suitable communication protocol) during operation of the engine 10 and comprise sensor data and/or actuator data. The sensor data may be, for instance, measurements taken by the various sensors. The actuator data may be, for instance, data relating to a state of an actuator before or after an actuation action has occurred, said data for instance taken by a sensor integrated into the actuator.

At step 404, the input signals are combined, at the interface module, into an output signal indicative of the operation of the engine 10. For instance, said combining may be carried out by the data concentrator 54 of the interface module 50. Combining of the input signals at step 404 may comprise multiplexing, as described herein above. Combining of the input signals at step 404 may also comprise signal conversion. For instance, if the input signals are of different types, the input signals are converted into a single signal type, for instance by the data concentrator 54. If the input signals are of a first signal type, they may also be converted into a second signal type. In some embodiments, the input signals received at the interface module are electrical signals and/or optical signals.

At step 406, the output signal is transmitted (e.g., via communication link 62, using any suitable communication protocol) by the interface module to the controller located remote from the aircraft engine 10.

At optional step 408, the interface module receives (e.g., via communication link 62) instructions from the controller to actuate at least one actuator, and then transmits (e.g., via at least one communication link 82 associated with the at least one actuator) the instructions to the at least one actuator to cause actuation thereof.

At optional step 410, the interface module receives (e.g., via communication link 62) from the controller data, for instance sensor data and/or actuator data, and transmits (e.g., via communication link 92) the data to a data collection unit, for instance DCU 90, provided on the engine 10. The DCTU 90 may then store the received data in memory.

At optional step 412, the interface module receives (e.g., via power cable 64) an electrical power input from the controller, derives an electrical power output from the electrical power input, and supplies the electrical power output to at least one of the one or more sensors and/or the one or more actuators. The electrical power input may have a first direct current (DC) voltage, and deriving the electrical power output from the electrical power input may thus comprises converting the first DC voltage to a second DC voltage. This may be performed using the power conditioning unit 52.

It can be appreciated from the foregoing that at least some embodiments have an interface module provided on the engine receiving data from sensors and actuators and relaying this data to an controller positioned in a remote or off-engine location, thereby allowing the engine-to-controller harness to have a reduction in weight, complexity and cost. The maintenance costs for the harness may be reduced as well, since the number of wires passing from the engine is significantly reduced. The design and assembly complexity of the controller may be reduced as well, as a minimal number of cables or wires are to be installed.

Figure 5:
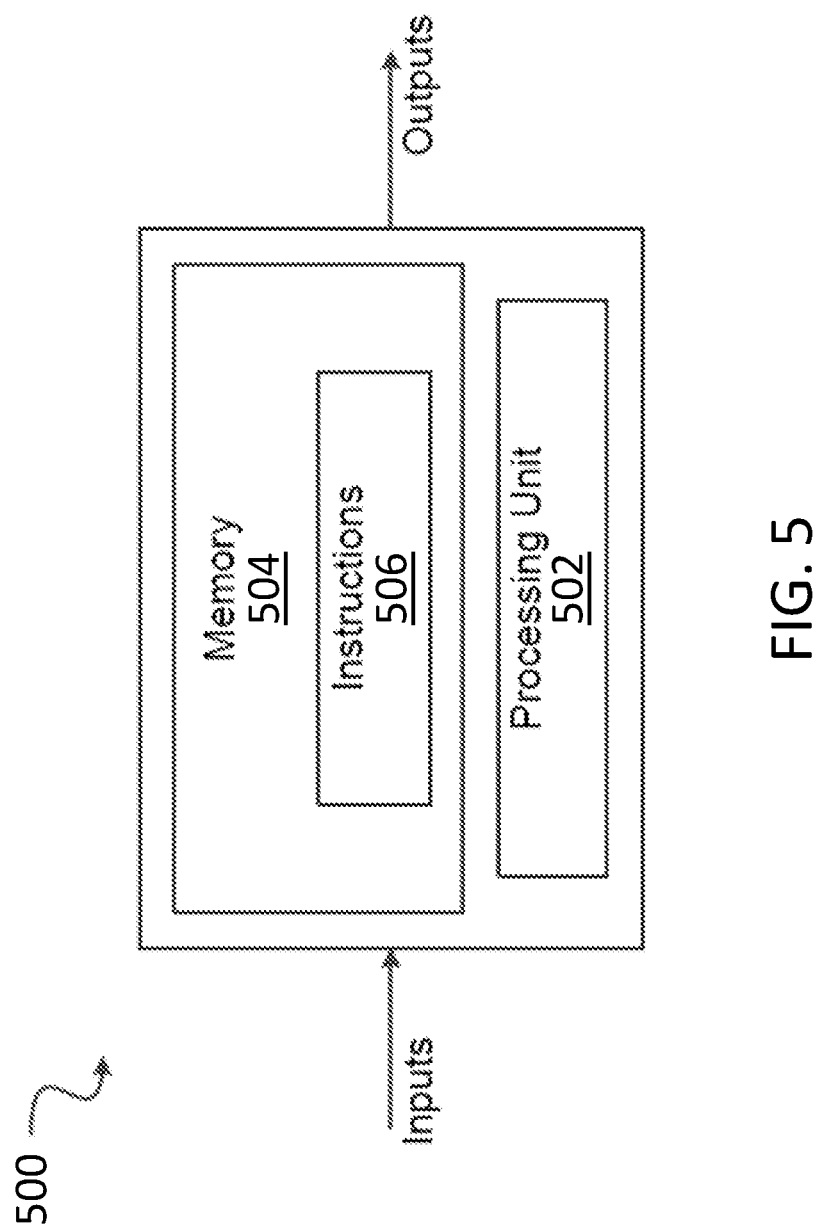
FIG. 5 is a block diagram of an example computing device for implementing the method of FIG. 4.

With reference to FIG. 5, an example of a computing device 500 is illustrated. For simplicity only one computing device 500 is shown but the system may include more computing devices 500 operable to exchange data. The computing devices 500 may be the same or different types of devices. The controller 40 and/or interface module 50 may be implemented with one or more computing devices 500. Note that the controller 40 can be implemented as part of a full-authority digital engine controls (FADEC) or other similar device, including electronic engine control (EEC), engine control unit (ECU), electronic propeller control, propeller control unit, and the like. In some embodiments, the controller 40 is implemented as a Flight Data Acquisition Storage and Transmission system, such as a FAST™ system. The controller 40 may be implemented in part in the FAST™ system and in part in the EEC. Other embodiments may also apply.

The computing device 500 comprises a processing unit 502 and a memory 504 which has stored therein computer-executable instructions 506. The processing unit 502 may comprise any suitable devices configured to implement the method 400 such that instructions 506, when executed by the computing device 500 or other programmable apparatus, may cause the functions/acts/steps performed as part of the method 400 as described herein to be executed. The processing unit 502 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to the device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

The methods and systems for transmitting data in an engine described herein may be implemented in a high level procedural or object oriented programming or scripting language, or a combination thereof, to communicate with or assist in the operation of a computer system, for example the computing device 500. Alternatively, the methods and systems for transmitting data in an engine may be implemented in assembly or machine language. The language may be a compiled or interpreted language. Program code for implementing the methods and systems for transmitting data in an engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for transmitting data in an engine may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method for transmitting data from an aircraft engine, the method comprising:
receiving at an interface module, during an operation of the aircraft engine, a plurality of input signals from one or more sensors of the aircraft engine, one or more actuators of the aircraft engine, or any combination of the one or more sensors and the one or more actuators, the interface module mounted on the aircraft engine and forming an on-engine relay hub between an electronic engine controller (EEC) of the aircraft engine and the one or more sensors and the one or more actuators, the EEC being located remotely from the aircraft engine;
combining, at the interface module, the plurality of input signals, and generating, by the interface module, a single output signal based on the plurality of input signals and indicative of the operation of the aircraft engine; and
transmitting the single output signal from the interface module to the EEC located remotely from the aircraft engine, the EEC operable for controlling the operation of the aircraft engine based on data contained in the single output signal.

2. The method as defined in claim 1, wherein the plurality of input signals are received via a plurality of first communication links coupling the interface module to the one or more sensors of the aircraft engine, the one or more actuators of the aircraft engine, or any combination of the one or more sensors and the one or more actuators, and further wherein the single output signal is transmitted via a second communication link coupling the interface module to the EEC.

3. The method as defined in claim 1, wherein the combining the plurality of input signals into the single output signal comprises multiplexing the plurality of input signals.

4. The method as defined in claim 3, wherein the combining the plurality of input signals into the single output signal further comprises converting the plurality of input signals having at least a first signal type and a second signal type into the single output signal having one of the first signal type and the second signal type.

5. The method as defined in claim 4, wherein the plurality of input signals are a plurality of electrical signals and a plurality of optical signals, and further wherein the single output signal is one of an electrical signal and an optical signal.

6. The method as defined in claim 3, wherein the combining the plurality of input signals into the single output signal further comprises converting the plurality of input signals having a first signal type into the single output signal having a second signal type.

7. The method as defined in claim 6, wherein the plurality of input signals are a plurality of electrical signals, and further wherein the single output signal is an optical signal.

8. The method as defined in claim 1, further comprising receiving instructions from the EEC to actuate at least one actuator configured to adjust at least one parameter of the aircraft engine, and transmitting the instructions to the at least one actuator.

9. The method as defined in claim 1, further comprising receiving, via a power cable coupling the interface module to the EEC, an electrical power input from the EEC, deriving an electrical power output from the electrical power input, and supplying the electrical power output to at least one of the one or more sensors of the aircraft engine, the one or more actuators of the aircraft engine, or any combination of the one or more sensors and the one or more actuators.

10. The method as defined in claim 9, wherein the electrical power input has a first direct current (DC) voltage, and further wherein the deriving the electrical power output from the electrical power input comprises converting the first DC voltage to a second DC voltage.

11. The method as defined in claim 2, further comprising receiving data from the EEC via the second communication link, and transmitting the data to a data collection unit provided on the aircraft engine, the data transmitted via a third communication link communicatively coupling the interface module to the data collection unit.

12. A system for transmitting data from an aircraft engine, the system comprising:

one or more sensors of the aircraft engine, one or more actuators of the aircraft engine, or any combination of the one or more sensors and the one or more actuators;

an electronic engine controller (EEC) located remotely from the aircraft engine; and a interface module associated with the aircraft engine, the interface module forming an on-engine relay hub between the electronic engine controller (EEC) of the aircraft engine and the one or more sensors and the one or more actuators, the interface module being communicatively coupled with the one or more sensors of the aircraft engine, one or more actuators of the aircraft engine, or any combination of the one or more sensors and the one or more actuators and with the EEC, the interface module configured to receive, during an operation of the aircraft engine, a plurality of input signals from the one or more sensors of the aircraft engine, one or more actuators of the aircraft engine, or any combination of the one or more sensors and the one or more actuators, combine the plurality of input signals, and generate a single output signal based on the plurality of input signals and indicative of the operation of the aircraft engine, and transmit the single output signal to the EEC located remotely from the aircraft engine;

wherein the EEC is operable for controlling the operation of the aircraft engine based on data contained in the single output signal.

13. The system as defined in claim 12, wherein the interface module is communicatively coupled to the one or more sensors of the aircraft engine, the one or more actuators of the aircraft engine, or any combination of the one or more sensors and the one or more actuators via a plurality of first communication links, and further wherein the interface module is communicatively coupled to the EEC via a second communication link.

14. The system as defined in claim 12, wherein the interface module is configured to multiplex the plurality of input signals for combining the plurality of input signals into the single output signal.

15. The system as defined in claim 14, wherein the interface module is configured to convert the plurality of input signals having at least a first signal type and a second signal type into the single output signal having one of the first signal type and the second signal type for combining the plurality of input signals into the single output signal.

16. The system as defined in claim 15, wherein the interface module is configured to receive the plurality of input signals comprising a plurality of electrical signals and a plurality of optical signals, and further wherein the interface module is configured to generate the single output signal being one of an electrical signal and an optical signal.

17. The system as defined in claim 14, wherein the interface module is configured to convert the plurality of input signals having a first signal type into the single output signal having a second signal type for combining the plurality of input signals into the single output signal.

18. The system as defined in claim 12, wherein the interface module is further configured to receive instructions from the EEC to actuate at least one actuator configured to adjust at least one parameter of the aircraft engine, and to transmit the instructions to the at least one actuator.

19. The system as defined in claim 12, wherein the interface module is further configured to receive, via a power cable coupling the interface module to the EEC, an electrical power input from the EEC, derive an electrical power output from the electrical power input, and supply the electrical power output to at least one of the one or more sensors of the aircraft engine, the one or more actuators of the aircraft engine, or any combination of the one or more sensors and the one or more actuators.

20. The system as defined in claim 13, wherein the interface module is further configured to receive data from the EEC via the second communication link, and transmit the data to a data collection unit provided on the aircraft engine, the data transmitted via a third communication link communicatively coupling the interface module to the data collection unit.

* * * * *